United States Patent
Bigi

(10) Patent No.: US 6,698,405 B2
(45) Date of Patent: Mar. 2, 2004

(54) RECIPROCATING INTERNAL COMBUSTION ENGINE WITH BALANCING AND SUPERCHARGING

(75) Inventor: Maurizio Bigi, Novi di Modena (IT)

(73) Assignee: Automac S.A.S. di Bigi Ing. Maurizio, Novi di Modena (IT)

( * ) Notice: Subject to any disclaimer, the term of this patent is extended or adjusted under 35 U.S.C. 154(b) by 0 days.

(21) Appl. No.: 10/177,724

(22) Filed: Jun. 20, 2002

(65) Prior Publication Data

US 2003/0183211 A1 Oct. 2, 2003

Related U.S. Application Data

(63) Continuation of application No. PCT/IT00/00540, filed on Dec. 20, 2000.

(30) Foreign Application Priority Data

Dec. 21, 1999 (IT) ........................................ MO99A0280

(51) Int. Cl.[7] .............................. F02B 33/00; F02B 33/20
(52) U.S. Cl. ...................................................... 123/560
(58) Field of Search ........................... 123/197.3, 197.4, 123/560

(56) References Cited

FOREIGN PATENT DOCUMENTS

| AT | 313458 | 1/1974 | | |
|---|---|---|---|---|
| GB | 561429 | 5/1944 | | |
| JP | 61085538 A | * 5/1986 | ........... | F02B/33/20 |
| JP | 63179130 A | * 7/1988 | ........... | F02B/33/20 |
| US | 3179092 | 4/1965 | | |
| WO | WO 90/15917 | 12/1990 | | |

OTHER PUBLICATIONS

International Search Report Publication No. WO 01/46574 A3 Regarding PCT Application No. PCT/IT00/00540.

* cited by examiner

Primary Examiner—Sheldon J. Richter
(74) Attorney, Agent, or Firm—Graybeal Jackson Haley LLP

(57) ABSTRACT

A reciprocating internal combustion engine with balancing and pre-compression is provided. The internal combustion engine comprises: at least one active cylinder, at least one auxiliary cylinder positioned at right-angles to the active cylinder, the throw of the pistons of the relative cylinders positioned on the same drive shaft, and fuel supply parts. Further, the internal combustion engine comprises the auxiliary cylinder equipped with cylinder head with a one-way valve for air inlet and a one-way valve for air outlet. Additionally, the cylinder head of the active cylinder has at least one outlet valve and at least one opening for the inlet of the air into the active cylinder. Finally, the phase of the piston of the auxiliary cylinder precedes the phase of the piston of the active cylinder by 90 degrees. The description includes two-cylinder versions, two-and four stroke, for petrol and diesel cycles, as well as multi-cylinder and turbocharged versions.

18 Claims, 6 Drawing Sheets

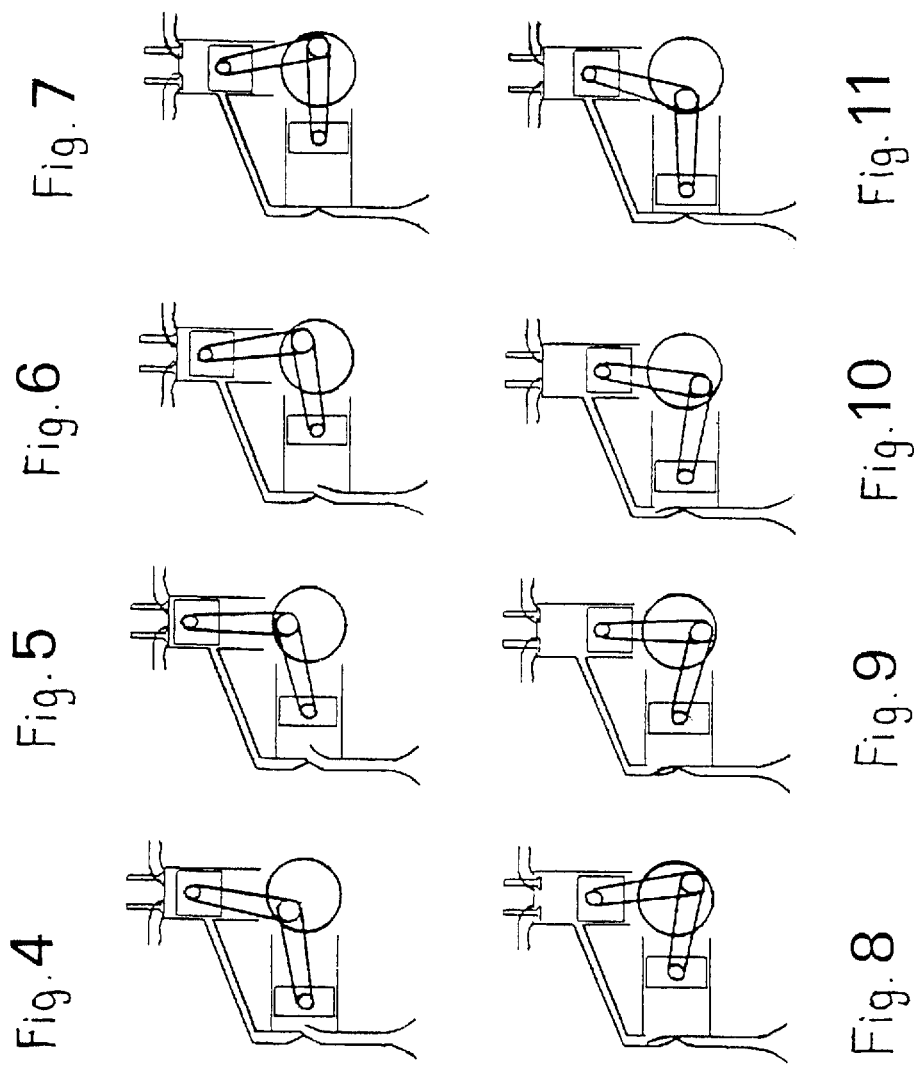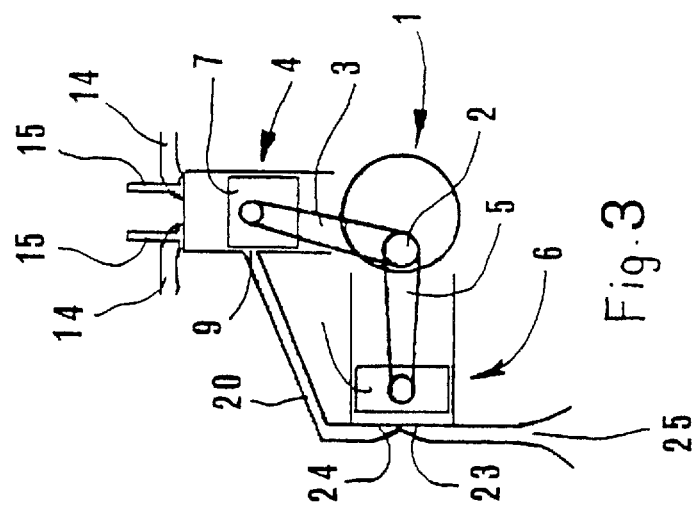

RECIPROCATING INTERNAL COMBUSTION ENGINE WITH BALANCING AND SUPERCHARGING

CROSS REFERENCE TO RELATED APPLICATIONS

This application claims priority from PCT/IT00/00540, published in English, filed Dec. 20, 2000, base on Italian patent application MO99A00280, filed Dec. 21, 1999.

TECHNICAL FIELD OF THE INVENTION

The invention concerns reciprocating combustion engine with balancing and pre-compression, and more specifically, an internal combustion engine of the type with a thrust crank in which there are mechanisms that simultaneously perform the functions of balancing and pre-compression of the air intake; said engine employing either the petrol cycle or the diesel cycle and indifferently being two- or four-stroke.

BACKGROUND OF THE INVENTION

The state of the art already comprises internal combustion engines in which the balancing of the rotating masses is carried out by dedicated mechanisms that move synchronously with the rotation of the drive shaft. The state of the art also comprises engines equipped with compression mechanisms that move synchronously with the rotation of the drive shaft.

In fact, for several years there have been two-stroke internal combustion engines with a piston for compressing the flushing air, carried out by a dedicated piston rotated by a right-angle preceding the active piston, which with every cycle pumps the compressed flushing air. These, however, are not balanced, as the throw of the auxiliary piston is rotated 180 degrees with respect to the drive crank, and also the window distribution and the doubled active piston do not yeild acceptable results regarding imposed limitations to avoid pollution of the atmosphere.

Moreover, as in patent application PCT WO90/15917, there is a four-stroke combustion engine with two in-line cylinders and with throw at 180 degrees in which there is an auxiliary cylinder connected to its own crank-shaft with a multiplication ratio of 2:1 with the drive shaft, to perform the compression of the flushing air and to achieve the balancing of the second order forces of inertia, whereas the first order forces of inertia are balanced by the arrangement of the throw at 180 degrees. However, such an engine is of considerable mechanical complexity due to the shaft dedicated to the auxiliary piston, and it imposes performance limits due to the mechanical limits of the auxiliary piston crankshaft, which, in turn, imposes a severe limit on the speed of rotation of the engine.

Furthermore, there are engines with one cylinder positioned at right-angles to another cylinder, both active, which balance each other in regard to first order forces of inertia.

Finally, there are also mechanisms with auxiliary piston rods rotated 90 degrees to the main piston rod, which achieve the balancing of the rotating and reciprocating masses of a single cylinder engine. Regarding the first order forces of inertia: whereby the auxiliary piston rod is guided by a further smaller rod connected to the foot of the auxiliary piston rod which maintains a certain degree of unbalancing in the transverse direction of the drive shaft in that the said smaller rod is guided at its free end by a rocker arm which cannot have the infinite radius theoretically required. This is in direct contrast to the configuration in which both cylinders and therefore both piston rods are active. Consequently, the said configuration limits the use of this balancing mechanism to the specific purpose, increasing manufacturing costs without obtaining further advantages. Also, in the previous configuration of the two cylinders at 90 degrees there is the complexity of a two cylinder engine and operating characteristics which are intrinsically not improvable, in that the cylinders are limited by the relative reciprocal function.

Such state of the art may be subject to considerable improvement regarding the possibility of eliminating the drawbacks described above, achieving an integration of the moving parts which simplify construction and thereby reducing cost and weight, eliminating the drawbacks mentioned previously.

SUMMARY OF THE INVENTION

From the foregoing emerges the need to resolve the technical problem of achieving a configuration of parts which in the typical thrust mechanisms of reciprocating combustion engines reduces vibrations caused by the first order forces generated by the movements of the reciprocating masses, and which may at the same time improve the thermodynamic efficiency of the combustion thereby reducing consumption and pollution, and achieving a higher specific power.

The invention resolves the said technical problem by adopting: reciprocating combustion engine with balancing and pre-compression, comprising at least one active cylinder; at least one auxiliary cylinder positioned at right-angles to the active cylinder; the throw of the pistons of the relative cylinders positioned on the same drive shaft; fuel supply organs; the auxiliary cylinder equipped with cylinder head with a one-way valve for air inlet and a one-way valve for air outlet, characterized in that it has the cylinder head of the active cylinder with at least one outlet valve and at least one opening for the inlet of the air into the active cylinder; finally, having the phase of the piston of the auxiliary cylinder preceding the phase of the piston of the active cylinder by 90 degrees.

An embodiment: comprises a single active cylinder and a single auxiliary cylinder, with both piston rods connected to the same throw of the crankshaft.

An embodiment further comprises two active cylinders and one auxiliary cylinder, with the piston rods of the active cylinders and of the auxiliary cylinder all connected to the same throw.

Another embodiment further comprises, as a variant of the previous one: two active cylinders and one auxiliary cylinder, with the piston rods of the active cylinders and of the auxiliary cylinder each connected to its own throw, and the three throw in phase with each other.

Yet another embodiment further comprises two active cylinders and two corresponding auxiliary cylinders with the throw at 180 degrees and each connected to the corresponding piston rod of the active cylinder and of the auxiliary cylinder.

Yet another embodiment further comprises more than one outlet valve in the cylinder head.

Yet another embodiment further comprises in the case of multi-cylinder engines: more than one active cylinder with one corresponding auxiliary cylinder for each active cylinder, with the piston rods of each active cylinder and of the corresponding auxiliary cylinder connected to the same throw.

Still further, another embodiment further comprises in the case of two stroke engines: the said opening for the inlet consisting of a series of flushing apertures made in the liner of the active cylinder.

Still further, another embodiment further comprises an exhaust turbo-compressor device for the air inlet, connected for its supply upstream of the one-way inlet valve and for the exhaust gases downstream of the one or more said outlet valves.

Still further, another embodiment further comprises, to achieve the diesel cycle, the said fuel supply parts consisting, advantageously of a pump-injector positioned on the axis of the cylinder head of each active cylinder.

Finally, yet another embodiment comprises, to achieve the petrol cycle, the said fuel supply organs consisting, advantageously of a fuel injector positioned in the supply tube upstream of the said inlet opening/valve in the cylinder head of the active cylinder; alternatively consisting of a fuel injector which injects the fuel directly into the combustion chamber.

The advantages obtained with this invention are: the single cylinder engine is intrinsically balanced as regards the first order forces of inertia and at the same time the parts that achieve this also achieve the pre-compression of the air intake, without using other parts or specific additional devices.

Also, the configuration with active cylinder and auxiliary balancing and pre-compression cylinder can be used both with the petrol cycle and the diesel cycle, both two- or four-stroke, in that the lubrication system is separate from the air supply and identical in both the two- and four-stroke engines, and this makes it intrinsically ecological.

Furthermore, the greatest advantages are obtained with the diesel cycle, due to the increase in specific power which is comparable with that of a petrol cycle engine without turbo charging. In the case of a two-cylinder four-stroke engine in the configuration with the throw in phase, the torque distribution is more even, without penalizing operation at high speeds of rotation, in that it is intrinsically balanced. In the two-cylinder version with an auxiliary cylinder for each active cylinder and the throw at 180 degrees, also the second order forces of inertia are compensated.

Finally, the adopted configuration is particularly advantageous in a four-stroke petrol cycle engine in which the intake tube feeds the traditional intake valves and the effect of the increased quantity of air pumped by the auxiliary cylinder is theoretically double. The adopted configuration is also highly advantageous when used with the two-stroke diesel cycle, in that the flushing cycle is carried out using the same parts that subsequently are also capable of performing the pre-compression, enabling excellent results to be obtained, in that the flushing is carried with pure air, without losing energy due to partially burned fuel at the exhaust thereby also causing less pollution.

BRIEF DESCRIPTION OF THE DRAWINGS

Some embodiments of the invention are illustrated, purely by way of example, in the three tables of drawings attached, in which:

FIGS. 3 to 11 are the phases of the operating cycle of the two-stroke engine;

DETAILED DESCRIPTION OF THE INVENTION

Figure 1:
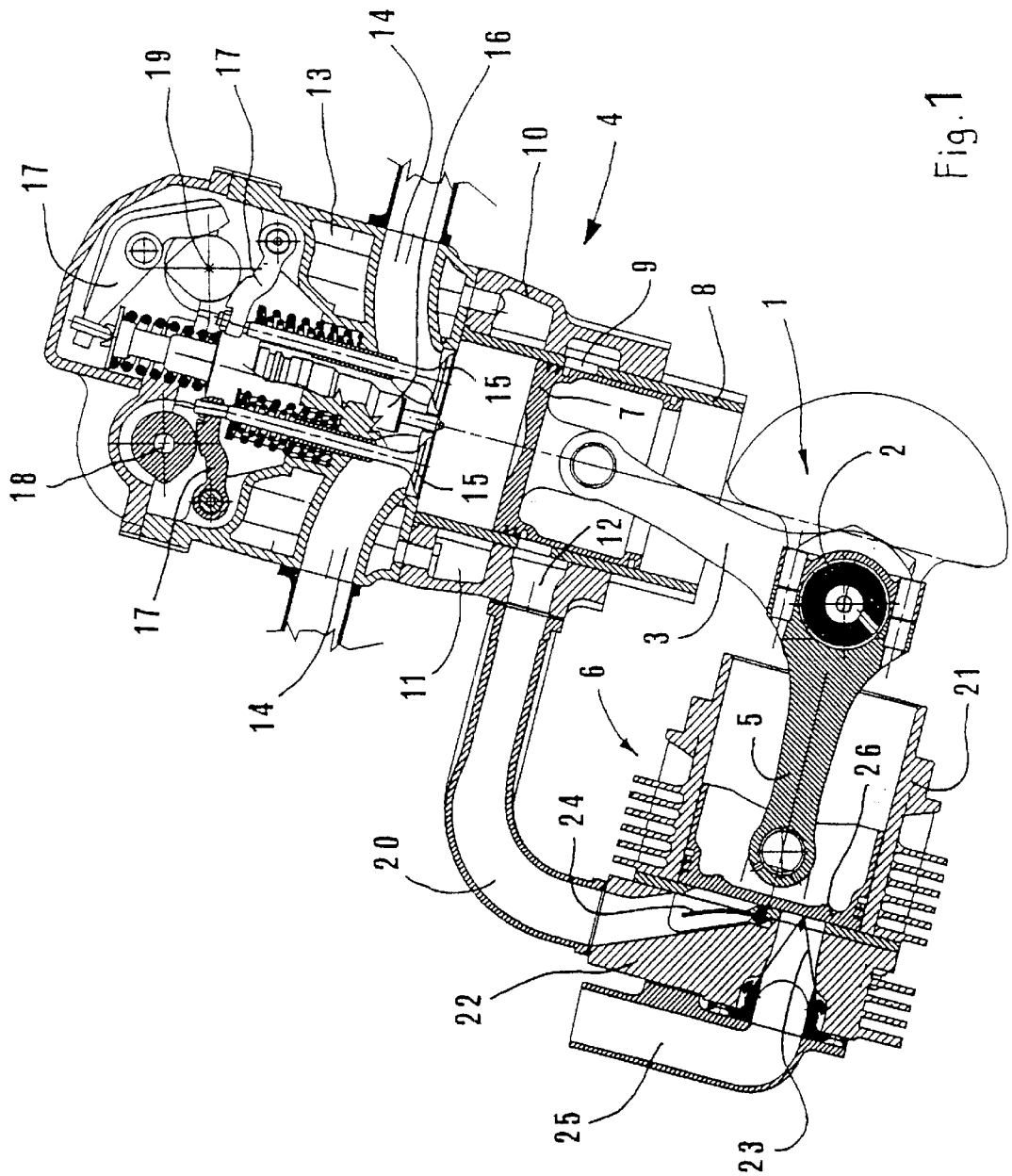
FIG. 1 is a longitudinal section of the active cylinder and the balancing/pre-compression cylinder of the combustion engine according to the invention, in the 2-stroke diesel version.

FIG. 1 shows: the drive shaft with throw 2 to which are attached a first piston rod 3 of the active cylinder 4 and a second piston rod 5 for the auxiliary cylinder 6; 7, the piston of the active cylinder, moving inside the liner 8 having flushing apertures 9; 10, the casing of the said liner having conduits 11 for cooling and conduits 12 to feed the said flushing apertures; 13, the cylinder head of the said active cylinder, having exhaust conduits 14 and corresponding valves 15; 16, the pump-injector, driven like the valves by rocker 17, driven by camshafts 18 or 19; 20, the supply tube between the said auxiliary cylinder 6 and the said flushing apertures 9; 21, the ribbed cast-liner of the auxiliary cylinder; 22, the cylinder head of the auxiliary cylinder with lamellar intake valve 23 and outlet valve 24; 25, the air intake tube; 26, the piston of the said auxiliary cylinder.

Figure 2:
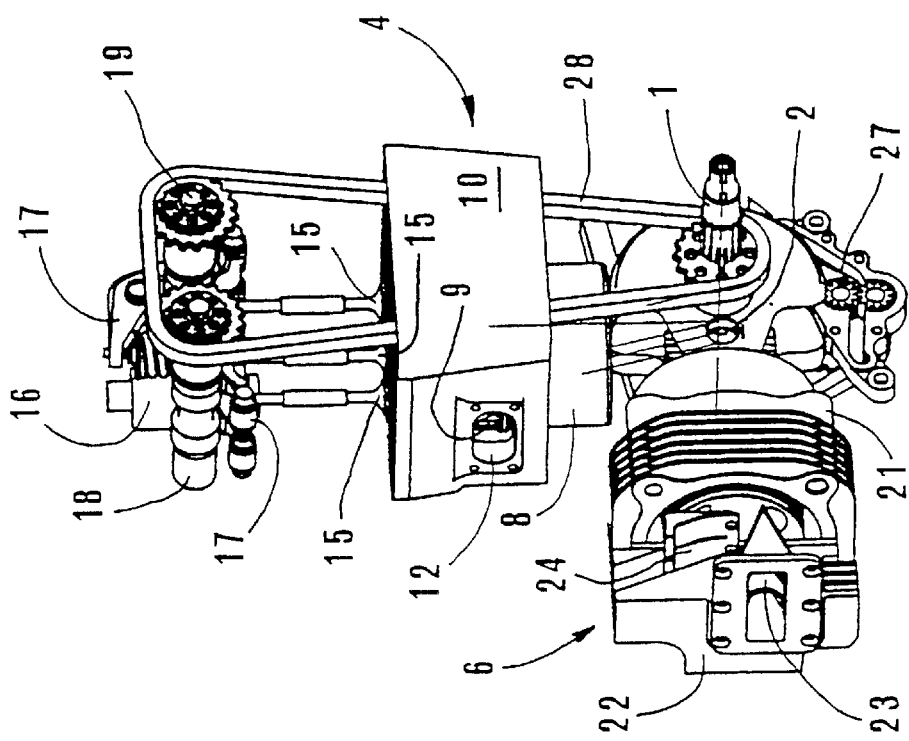
FIG. 2 is a prospective view of the cylinders in FIG. 1, showing just the essential parts.
Figure 14:
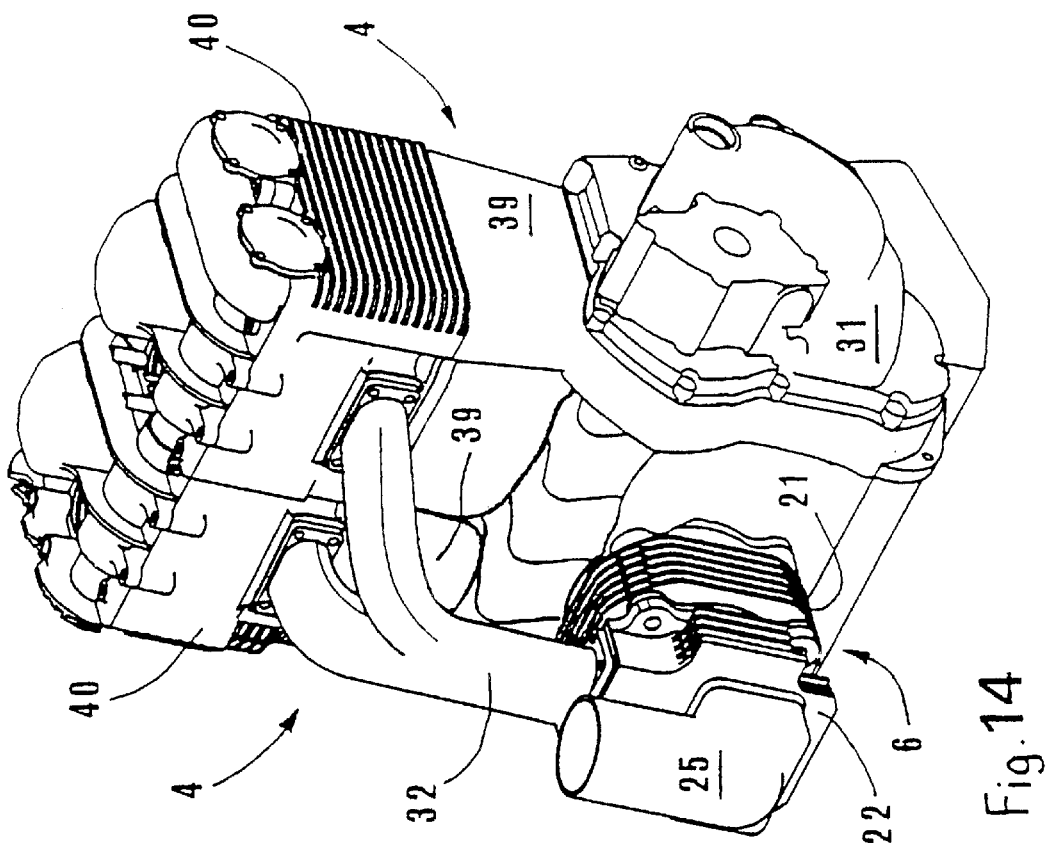
FIG. 14 is the prospective view of a two-cylinder four-stroke engine, with single auxiliary cylinder and with throw of both the auxiliary cylinder and of the active cylinders in phase.
Figure 12:
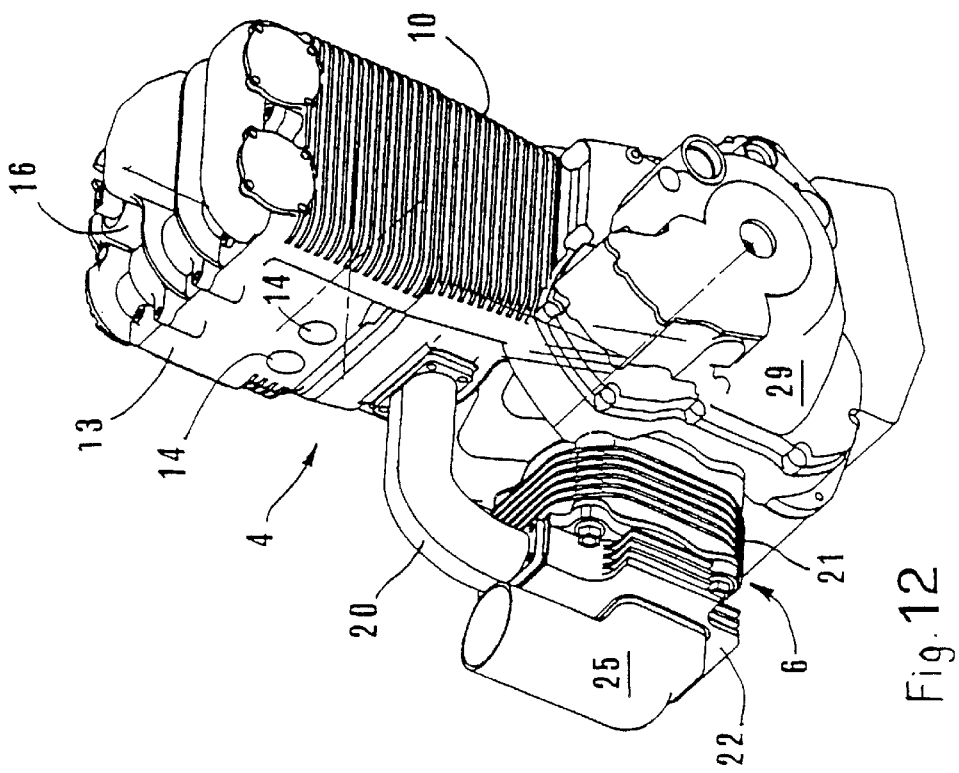
FIG. 12 is the prospective view of a complete single-cylinder engine according to the invention.
Figure 15:
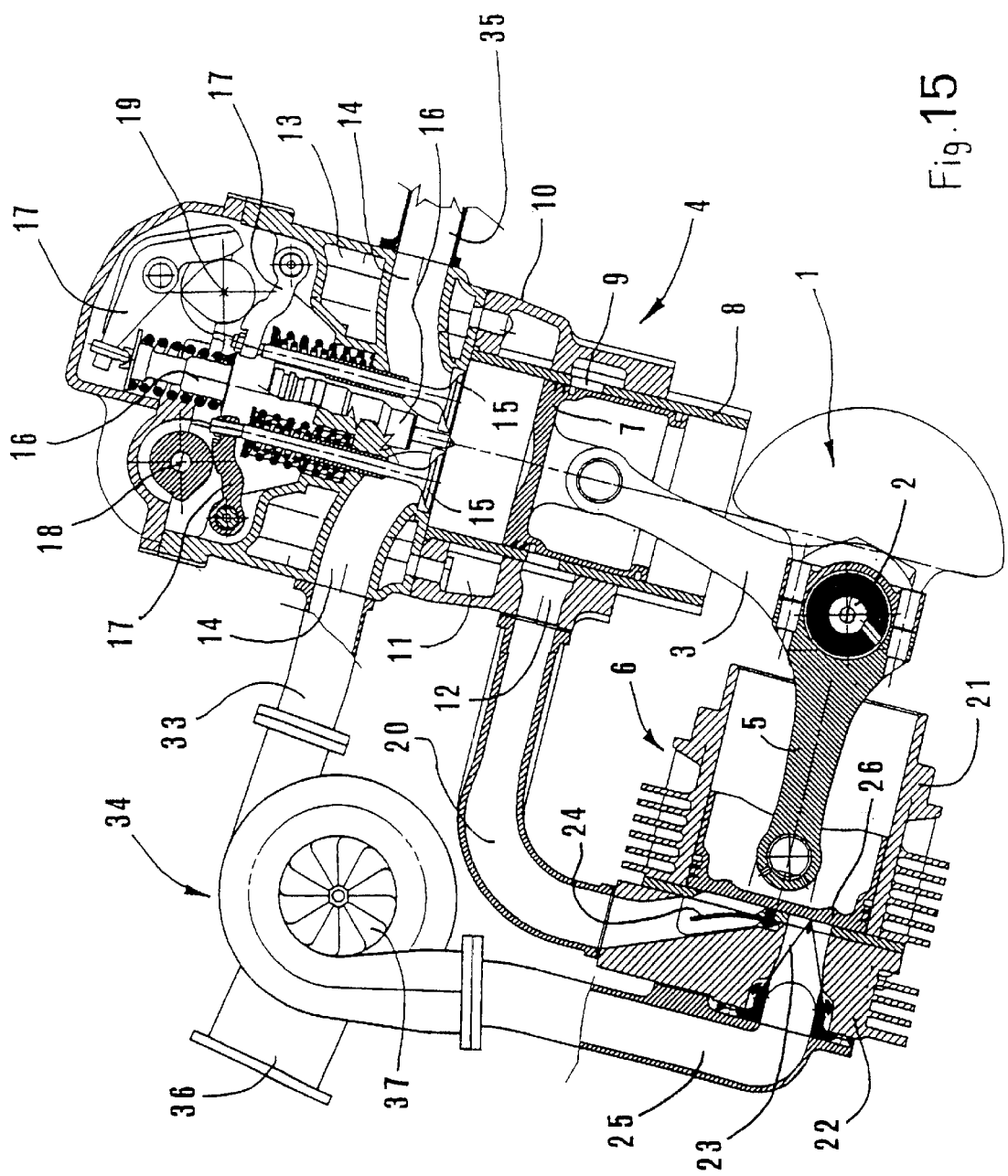
FIG. 15 is a section similar to that of FIG. 1, of a turbocharged two-stroke engine, with turbocharging of the air aspirated from the auxiliary cylinder.

FIG. 2 shows the lubrication gear pump; 28, the drive chain for the camshafts 18 and 19; 29, the housing of the single-cylinder engine and 30 the housing of the two-cylinder engine; 31, FIG. 14, the housing of the two-cylinder four-stroke engine with single auxiliary cylinder 6, where, advantageously, the throw of the cylinders are in phase; 32, the double supply tube to feed the intake valves of the said cylinder; 33, FIG. 15, an exhaust manifold connected to the turbocharger 34 to which is also connected the exhaust manifold 35 of the other exhaust valves 15; the final exhaust tube of the burned gases; 37, the inlet of the air which the turbocharger pushes along the said tube 25.

Figure 16:
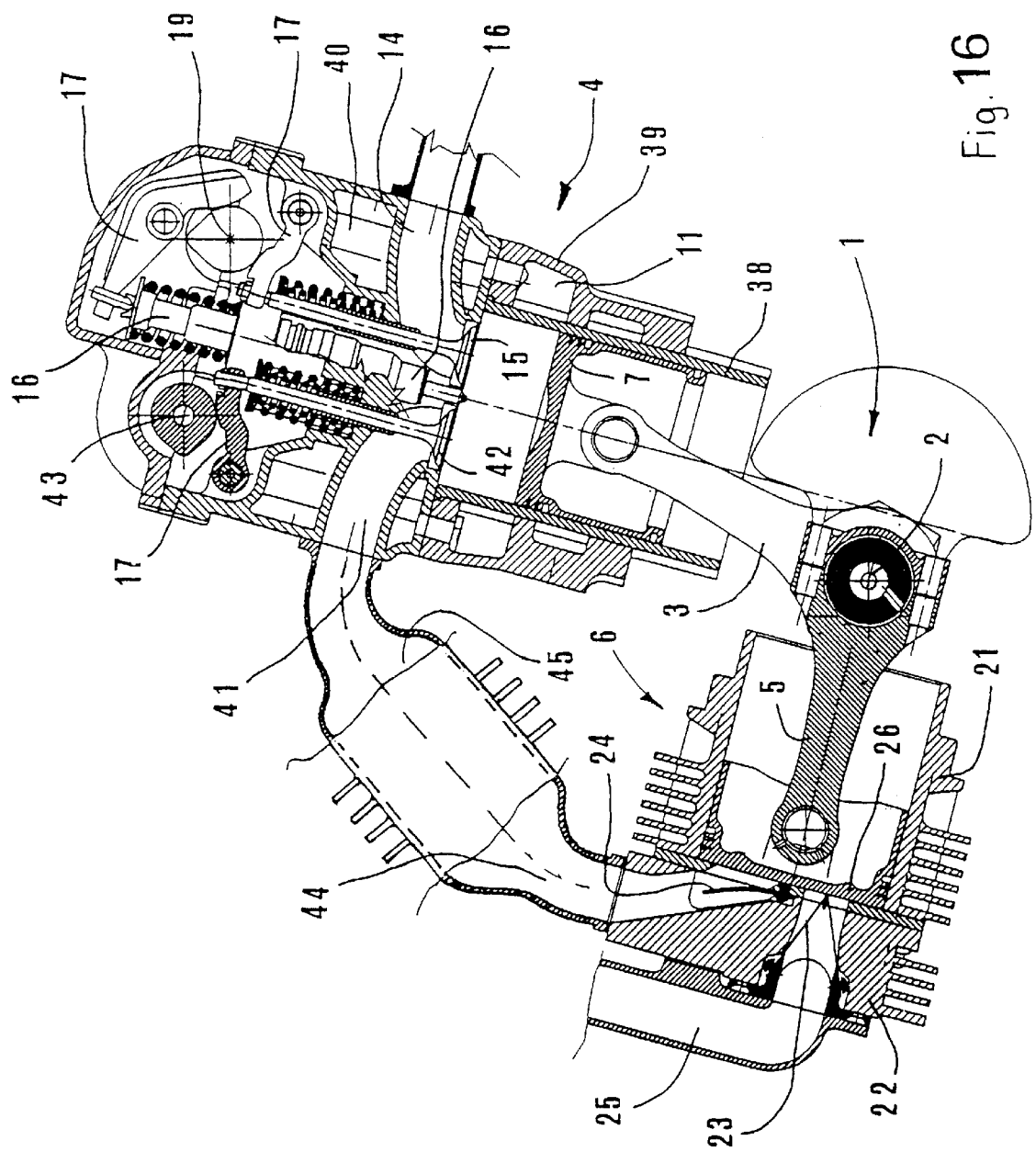
FIG. 16 is a section, as the previous one, of a four-stroke engine with a cooling and accumulation device for the air compressed by the auxiliary cylinder.

The figures also show, in FIG. 16, the liner of the active cylinder 4, when made for a four-stroke cycle, positioned inside the casing 39 to which the cylinder head 40 is connected; 41, the inlet tube which conducts the pumped air from the said auxiliary cylinder 6 to the inlet valves 42; 43, the camshaft driving the inlet valves; 44, the supply tube for the said air, with compensation chamber 45 to enable a sufficient accumulation of air and for cooling, for the double pumping cycle performed by the auxiliary cylinder 6, only 360 degrees, with respect to the 720 degree cycle of the active cylinder 4.

Operation of the combustion engine with auxiliary balancing and pre-compression cylinder is as follows.

With reference to FIGS. 3 to 11, the piston 7 of the active cylinder 4 in the first phase, FIG. 3, is under compression being already beyond the flushing aperture 9 and with the valves 15 in the cylinder head closed; the 26 of the auxiliary cylinder 6 is at its TDC; rotation is clockwise, when viewing the figure, and in the following phase, FIG. 4, the piston 7 is already at the end of the compression phase, whereas the piston 26 of the auxiliary cylinder is in the air intake phase from the lamellar valve 23; in FIG. 5 the piston 7 has reached its TDC: that is, in proximity to this point it is in the injection phase, for the diesel cycle, or forced ignition phase for the petrol cycle. In FIG. 6 the piston 7 of the active cylinder 4 is in the expansion phase, that is the burning gases produce the maximum thrust on it and the exhaust valves 15 start to open, while the piston 26 of the auxiliary cylinder 6 is close to its BDC, which it reaches in the following FIG. 7; in the phase shown in FIG. 8 the said valves are completely open and the gases escape through the exhaust, while the lamellar valve 24 is open and the air is forced through the supply tube 20 and through the aperture 9 into the active cylinder; in FIG. 9 the subsequent phase is shown with the piston of the active cylinder 4 at its BDC, while the supply tube conducts air pumped by the auxiliary cylinder 6; finally, FIG. 10 shows the final phase of the flushing in which the piston 26 of the auxiliary 6 is close to its TDC, but which pumps at a higher pressure the air in the supply tube and in the active cylinder 4 in which the flushing apertures 9 are still open, but the outlet valves 15 are closed; finally, FIG. 11 shows the same position of the crankshaft and pistons in their corresponding cylinders as shown in the initial FIG. 3.

Moreover, the excellent results obtained with this engine are as a result of the use of the auxiliary cylinder both as a balancing mechanism of the first order forces of inertia, for the thrust crank mechanism, and as pre-compressor to achieve a forced flushing of the active cylinder.

Furthermore, in the case of the single-cylinder four-stroke engine, as in FIG. 16, the pre-compression phase occurs twice in the 720 degree cycle of the active cylinder and, therefore, it is useful to provide a compensation volume 45, that can also have a cooling function, intercooler, for the compressed air.

Figure 13:
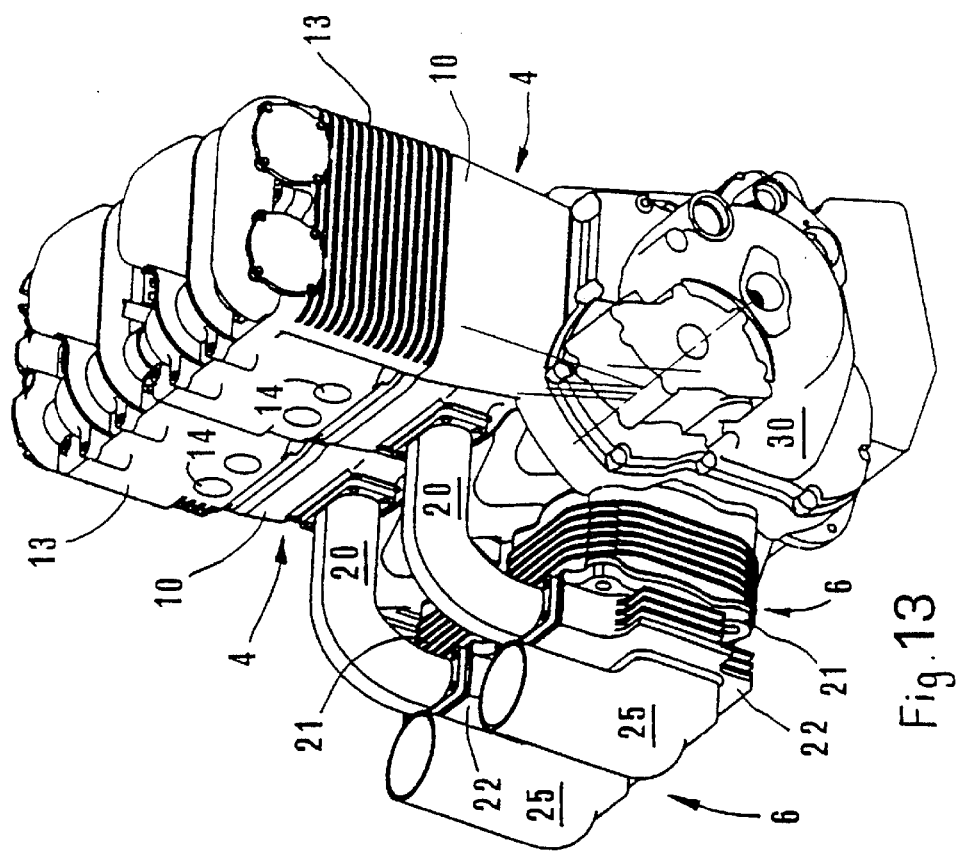
FIG. 13 is a prospective view of the engine in the preceding Figure, but with two cylinders, two-stroke and with the throw at 180 degrees.

Operation of the two-cylinder versions occurs in the same way, identical if the engine is two-stroke, as in FIG. 13, or four-stroke, as in FIG. 16, with the advantage that the compensation volume 45 in the case of the two-cylinder engine with throw at 360 degrees is not required, whereas the balancing effect of a single auxiliary cylinder 6, as indicated in FIG. 14, may also be achieved with the throw of the auxiliary cylinder at 180 degrees or 360 degrees to the throw of the active cylinders 4.

Finally, operation of the two-stroke engine equipped with a turbocharging device, is as described in FIGS. 3 to 11, in which the air supply to tube 25 occurs at a pressure higher than atmospheric pressure, so as to obtain excellent flushing and filling of the entire displacement even at the high speeds of rotation at which even the single cylinder engine is capable of reaching. The exhaust manifold 35 is connected to the exhaust manifold 33 to obtain the same back-pressure at the outlet with the lengths of the manifold being the same or different.

In the preceding examples reference has been made mainly to the diesel cycle combustion engine according to the invention, as it is easier and more convenient to use it in this way for its intrinsically ecological characteristics, that is, less polluting.

However, it is a very easy to replace the injector with a device for controlling the ignition and to position a fuel injection device in the supply tube 20 or 43, be it for a two- or four-stroke engine, to obtain operation with the petrol cycle; alternatively it is possible to position a petrol injector directly in the combustion chamber together with the ignition device.

In practice the materials, the dimensions and details of execution may be different from, but technically equivalent to, those described without departing from the juridical domain of present invention. Even though less convenient, the said one-way valves 23 or 24 with automatic opening may be replaced by valves which are operated mechanically.

Furthermore, the said one-way intake and outlet valves of the auxiliary cylinder can be more than one for each intake and/or outlet function; finally, the said multiple valves, with the same function, can be of different sizes and/or sensibilities to the opening pressure difference.

From the foregoing description, it will be appreciated that, although specific embodiments of the invention have been described herein for purposes of illustration, various modifications may be made without deviating from the spirit and scope of the invention. Accordingly, the invention is not limited except as by the appended claims.

I claim:

1. Reciprocating combustion engine with balancing and pre-compression, the combustion engine comprising:
    (a) at least one active cylinder having at least one piston, wherein a cylinder head of each active cylinder has at least one outlet valve and at least one opening for the inlet for air into the active cylinder;
    (b) at least one auxiliary cylinder having at least one piston, the auxiliary cylinder positioned at a right-angle to the active cylinder wherein each auxiliary cylinder is equipped with a cylinder head having a one-way valve for air inlet and a one-way valve for air outlet;
    (c) a throw of each piston of the relative cylinders positioned on a same drive shaft wherein the phase of the piston of the auxiliary cylinder precedes the phase of the piston of the active cylinder by 90 degrees, the phase difference operable to cause a double action characterized by the auxiliary cylinder acting as a balancing mechanism of the first order forces of inertia, and by a thrust crank mechanism acting as a pre-compressor to achieve a forced flushing of the active cylinder for the totality of flushing fluid, the double action allowing an increase specific power, use of the same thrust crank mechanism of the active cylinder and auxiliary cylinder for a petrol cycle or a diesel cycle, two- or four-stroke, engines, and operable to reach high speeds of rotation for a single cylinder engine; and
    (d) fuel supply parts operable to supply fuel to the active cylinder.

2. The combustion engine of claim 1, characterized in that the combustion engine further comprises two active cylinders and one auxiliary cylinder, with the pistons of the active cylinders and of the auxiliary cylinder all connected to the same throw.

3. The combustion engine of claim 1, characterized in that the combustion engine further comprises two active cylinders and one auxiliary cylinder, with the pistons of the active cylinders and of the auxiliary cylinder each connected to its own throw, and a third throw in phase with each other.

4. The combustion engine of claim 1, characterized in that the combustion engine further comprises an exhaust turbo-compressor device for the air inlet, connected for its supply upstream of the one-way inlet valve of the auxiliary cylinder and for the exhaust gases downstream of the one or more said outlet valves.

5. The combustion engine of claim 1, characterized in that the combustion engine further comprises more than one active cylinder with one corresponding auxiliary cylinder for each active cylinder, with the pistons of each active cylinder and of the corresponding auxiliary cylinder connected to the same throw.

6. The combustion engine of claim 1, characterized in that said opening for the inlet consists of a series of flushing apertures made in the liner of the active cylinder.

7. The combustion engine of claim 1, characterized in that, to achieve the petrol cycle, said fuel supply parts consists, advantageously of a fuel injector positioned in the supply tube upstream of said inlet opening/valve in the cylinder head of the active cylinder; alternatively consisting of a fuel injector which injects the fuel directly into the combustion chamber.

8. The combustion engine of claim 1, characterized in that, to achieve the diesel cycle, said fuel supply parts consists, advantageously of a pump-injector positioned on the axis of the cylinder head of each active cylinder.

9. The combustion engine of claim 1, characterized in that the combustion engine further comprises more than one outlet valve in the cylinder head.

10. The combustion engine of claim 9, characterized in that said opening for the inlet consists of a series of flushing apertures made in the liner of the active cylinder.

11. The combustion engine of claim 1, characterized in that said one-way intake valves and outlet valves of the auxiliary cylinder can be more than one for each intake and/or outlet function.

12. The combustion engine of claim 11, characterized in that said multiple valves, with the same function, can be of different sizes and/or sensibilities to the opening pressure difference.

13. The combustion engine of claim 1, characterized in that the combustion engine further comprises a single active cylinder and a single auxiliary cylinder, with both pistons connected to the same throw of a crankshaft.

14. The combustion engine of claim 13, characterized in that said opening for the inlet consists of a series of flushing apertures made in the liner of the active cylinder.

15. The combustion engine of claim 13, characterized in that the combustion engine further comprises more than one outlet valve in the cylinder head.

16. The combustion engine of claim 1, characterized in that the combustion engine further comprises two active cylinders and two corresponding auxiliary cylinders, each with the throw at 180 degrees and each connected to the corresponding piston of the active cylinder and piston of the auxiliary cylinder.

17. The combustion engine of claim 16, characterized in that said opening for the inlet consists of a series of flushing apertures made in the liner of the active cylinder.

18. The combustion engine of claim 16, characterized in that the combustion engine further comprises more than one outlet valve in the cylinder head.

* * * * *